United States Patent [19]
Kao

[11] Patent Number: 6,056,427
[45] Date of Patent: May 2, 2000

[54] ARTIFICIAL TREE WITH OPTICAL FIBRE ILLUMINATION AND ASSEMBLY METHOD THEREOF

[75] Inventor: Cheung Chong Kao, Hong Kong, The Hong Kong Special Administrative Region of the People's Republic of China

[73] Assignee: Boto (Licenses) Limited, Douglas, United Kingdom

[21] Appl. No.: 09/143,268

[22] Filed: Aug. 28, 1998

[51] Int. Cl.[7] .............................. F21W 121/04; F21V 8/00
[52] U.S. Cl. ............................ 362/581; 362/123; 362/568
[58] Field of Search .................................. 362/563, 567, 362/568, 581, 123, 396

[56] References Cited

U.S. PATENT DOCUMENTS

| | | | |
|---|---|---|---|
| 3,641,335 | 2/1972 | Wall | 362/567 |
| 3,878,503 | 4/1975 | Martin | 362/567 |
| 4,060,722 | 11/1977 | Foley | 362/568 |
| 4,068,118 | 1/1978 | Carrington | 362/568 X |
| 4,285,032 | 8/1981 | Honda et al. | 362/224 |
| 4,364,102 | 12/1982 | Huppert et al. | 362/123 |
| 4,777,571 | 10/1988 | Morgan | 362/123 |
| 4,858,086 | 8/1989 | Pietrantonio et al. | 362/123 |
| 4,878,157 | 10/1989 | Koch | 362/123 |
| 5,104,608 | 4/1992 | Pickering | 362/32 |
| 5,226,709 | 7/1993 | Labranche | 362/32 |
| 5,422,797 | 6/1995 | Shattan | 362/568 X |
| 5,517,390 | 5/1996 | Zins | 362/123 |
| 5,702,170 | 12/1997 | Broderick | 362/568 |
| 5,820,248 | 10/1998 | Ferguson | 362/123 |
| 5,829,863 | 11/1998 | Gutshall | 362/568 X |

*Primary Examiner*—Laura K. Tso
*Attorney, Agent, or Firm*—Wood, Herron & Evans, LLP

[57] ABSTRACT

An artificial tree has a trunk (22), a plurality of branches (24) secured to the trunk (22), and a plurality of optical fibers extending along the trunk (22) from an illumination source (46) to the branches, and being arranged in bundles (26) which extend along the branches (24), the bundles (26) being loosely secured to the branches (24) to allow a limited degree of movement, and splaying out at the branch tips.

19 Claims, 13 Drawing Sheets

ARTIFICIAL TREE WITH OPTICAL FIBRE ILLUMINATION AND ASSEMBLY METHOD THEREOF

BACKGROUND OF THE INVENTION

The present invention relates to an artificial tree which is provided with optical fibres which in use are illuminated, and to a method of assembly of such a tree.

It is known to incorporate optical fibres into artificial trees such as Christmas trees. For example, in U.S. Pat. No. 5,104,608 an artificial tree is provided having a plurality of fibres which extend from a light source in a base of the tree, being led along the trunk through hollow tubular branches to emerge at light-emitting points on the branches.

It is also known to provide a tree in which the fibres themselves form the trunk, being led off in bundles at the branches where the bundles are secured onto metal wires, over which is wrapped a foliage-like green roping. Each branch has a bundle of fibres which are wrapped up in tape, arranged adjacent to the central wire of the branch and this is overlain with the foliage-like roping, to emerge at the ends of the branches. One problem of this construction is that when such trees are packaged, or stored after use, the wire branches are generally bent inwardly towards the trunk, and this can cause damage or even lead to fracturing of the optical fibres so that the light-intensity of emitted light is reduced.

These arrangements also suffer the drawback that the addition of the fibres dictates the overall construction of the tree, and results in an arrangement which is labour intensive and expensive to assemble.

The present invention seeks to provide an artificial tree which overcomes the drawbacks.

SUMMARY OF THE INVENTION

According to a first aspect of the present invention there is provided an artificial tree comprising a trunk, a plurality of branches secured to the trunk, and a plurality of optical fibres extending along the trunk to the branches, and being arranged in bundles which extend along the branches, the bundles being loosely secured to the branches to allow a limited degree of movement.

The ability to accommodate a degree of relative movement allows the branches of the tree to be moved relative to the trunk for example when the tree is being stored or transported at which time the branches are bent flat towards the trunk. This movement is also useful to allow the branches to be bent into a natural tree-like shape.

In a further aspect there is provided an artificial tree comprising a trunk, a plurality of branches secured to the trunk, and a plurality of optical fibres extending along the trunk to the branches and being arranged in bundles secured to and led along the branches, and in the region of the free ends of the branches being free to splay out into a spray-like shape.

This gives tree a more pleasing appearance compared to conventional arrangements particularly when the fibres are illuminated.

In the preferred embodiment the bundles of optical fibres are secured to the branches by means of retaining clips, which may be U-shaped elements of springy material, the legs of the U-shape being formed with inclined surfaces facilitating the pushing of the clip over the optical fibres and branches. The retaining clips are preferably arranged at a position spaced from free ends of the branches, arranged at intervals along the branches, the optical fibres splaying outwardly at the branch ends.

The tree is preferably of a type where the branches are pivotably secured on the trunk. The fibres are arranged in bundles led along the interior of the trunk to emerge through openings in the trunk near the respective branches. A light source is provided enclosed in a housing at the base of the tree, the optical fibres extending from the light source along the trunk to the branches, with a rotatable colour wheel between the light source and lower ends of the fibres at which the light source is directed.

In a further aspect the invention resides in a method of assembly of an artificial tree provided with optical fibre illumination comprising the steps of: (i) arranging optical fibres into a plurality of bundles, each comprising a plurality of fibres, (ii) leading said bundles along the trunk and securing individual bundles to respective branches in a manner which allows a degree of movement of said bundles relative to the branches.

The bundles of fibres may be led along the interior of the trunk from a lower end thereof which is in use illuminated by a light source, to emerge from openings in the trunk near respective branches.

BRIEF DESCRIPTION OF THE DRAWINGS

An embodiment of the invention is now described, by way of example only, with reference to the following drawings in which.

DETAILED DESCRIPTION OF THE PREFERRED EMBODIMENTS

Figure 1A:
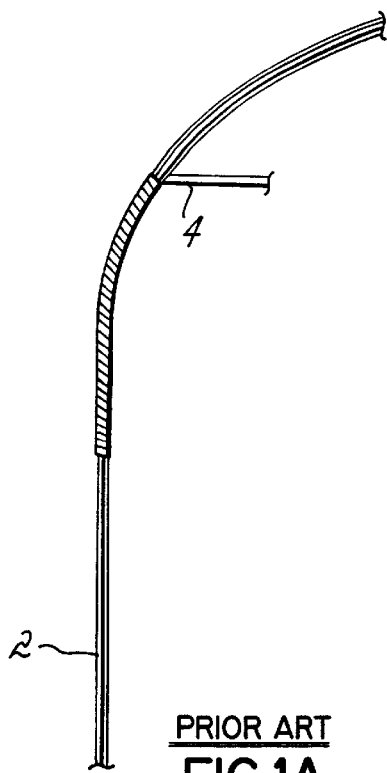
FIGS. 1(a) to (d) illustrate steps of forming a branch for a conventional tree with optical fibres.
Figure 1B:
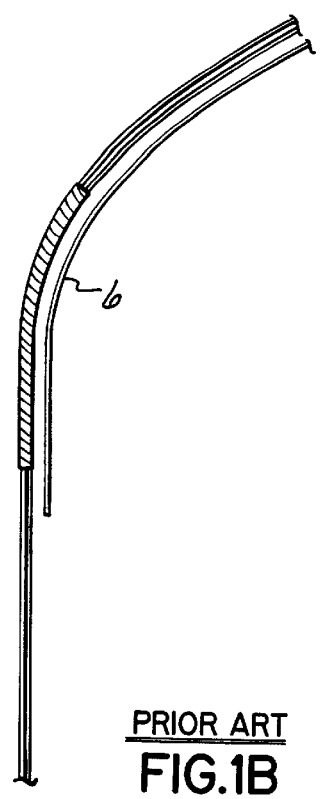
Figure 1C:
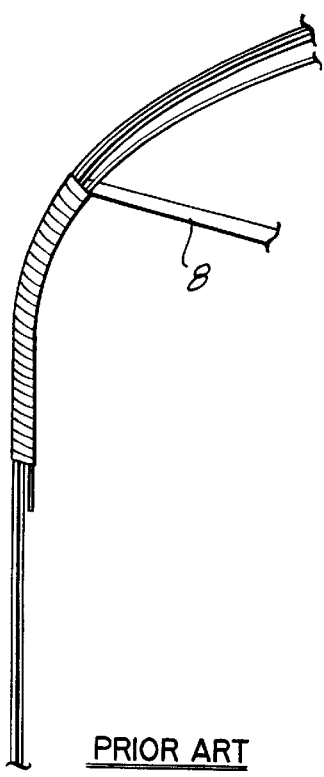
Figure 1D:
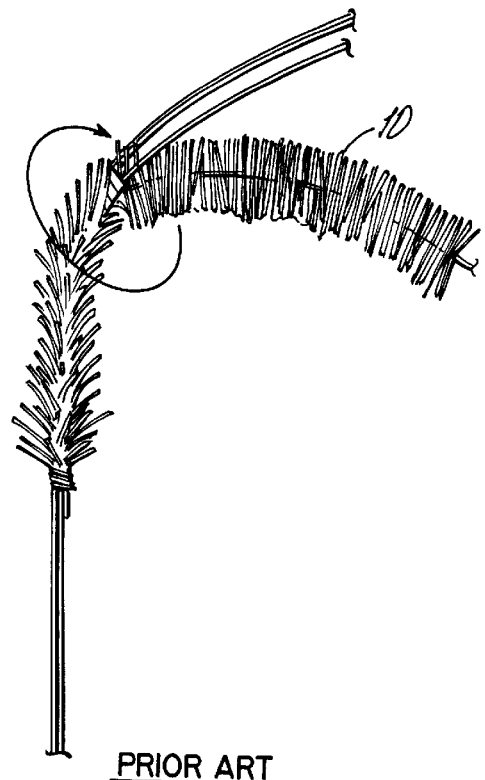
Figure 2C:
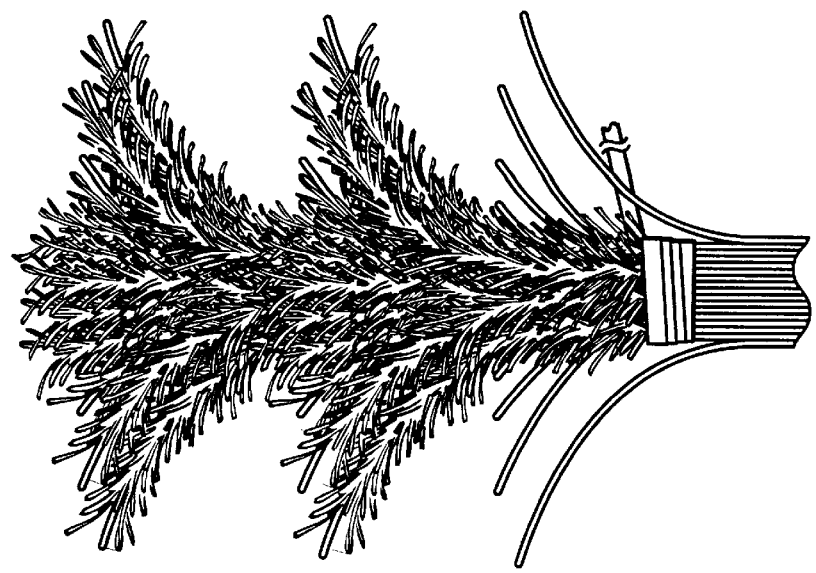
FIGS. 2(a) to (c) illustrate further steps in forming a conventional tree with optical fibres.
Figure 2B:
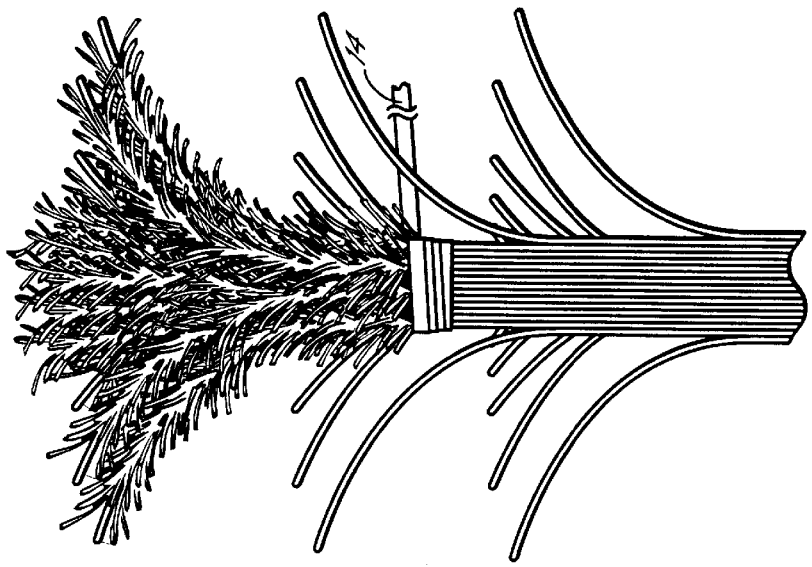
Figure 2A:
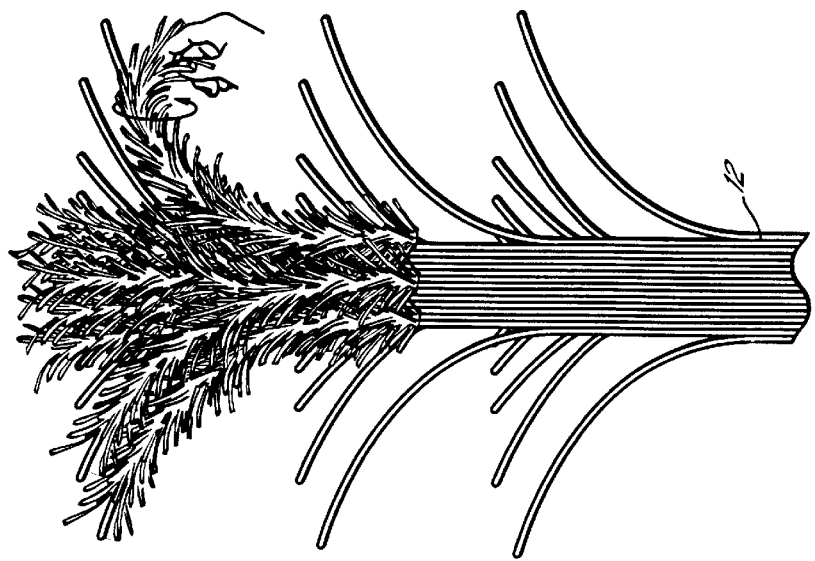

It is known to provide a Christmas tree with optical fibres, and in one form illustrated in FIGS. 1 and 2 the fibres themselves form the trunk of the tree, and at various positions are led off the trunk in bundles, a single bundle being associated with each branch of the tree. In FIGS. 1 and 2 the process for forming such a tree is illustrated. FIG. 1(a) shows a plurality of fibres 2 arranged in a bundle wrapped up with tape 4, which may be a piece of adhesive tape. As shown in FIG. 1(b) a metal wire 6 which forms the central stem for the branch is arranged along side the bundle, both parts being wrapped by further tape 8 as shown in FIG. 1(c). Starting from the top of the tree, a number of bundles are placed together so that the main lengths of the fibres constitute the trunk with the free ends of the fibres facing outwardly from the trunk.

Subsequently, a foliage-like roping material 10, which is commonly a plastics material shredded so as to resemble needles on a coniferous tree and green in colour is wrapped around the wire-containing bundle as indicated in FIG. 1(d). This process is repeated, placing a further set of wrapped bundles of fibres against the existing fibres at a lower position on the trunk to overlay the tape 14 of the bundles in the row above, and this process is repeated moving down the trunk 12. At the base of the trunk ends of the various bundles of fibres are cut off. An illumination source which is usually a high-intensity spotlight housed in a stand is directed at the ends of the optical fibre bundles.

As discussed above, this arrangement suffers the drawback that the optical fibres are liable to damage where the branches meet the trunk. The tree also has a rather unrealistic appearance the trunk getting successively thicker in steps at each row of branches. It is difficult with this construction to form trees of large height. It is also time-consuming and expensive to assemble.

Figure 3A:
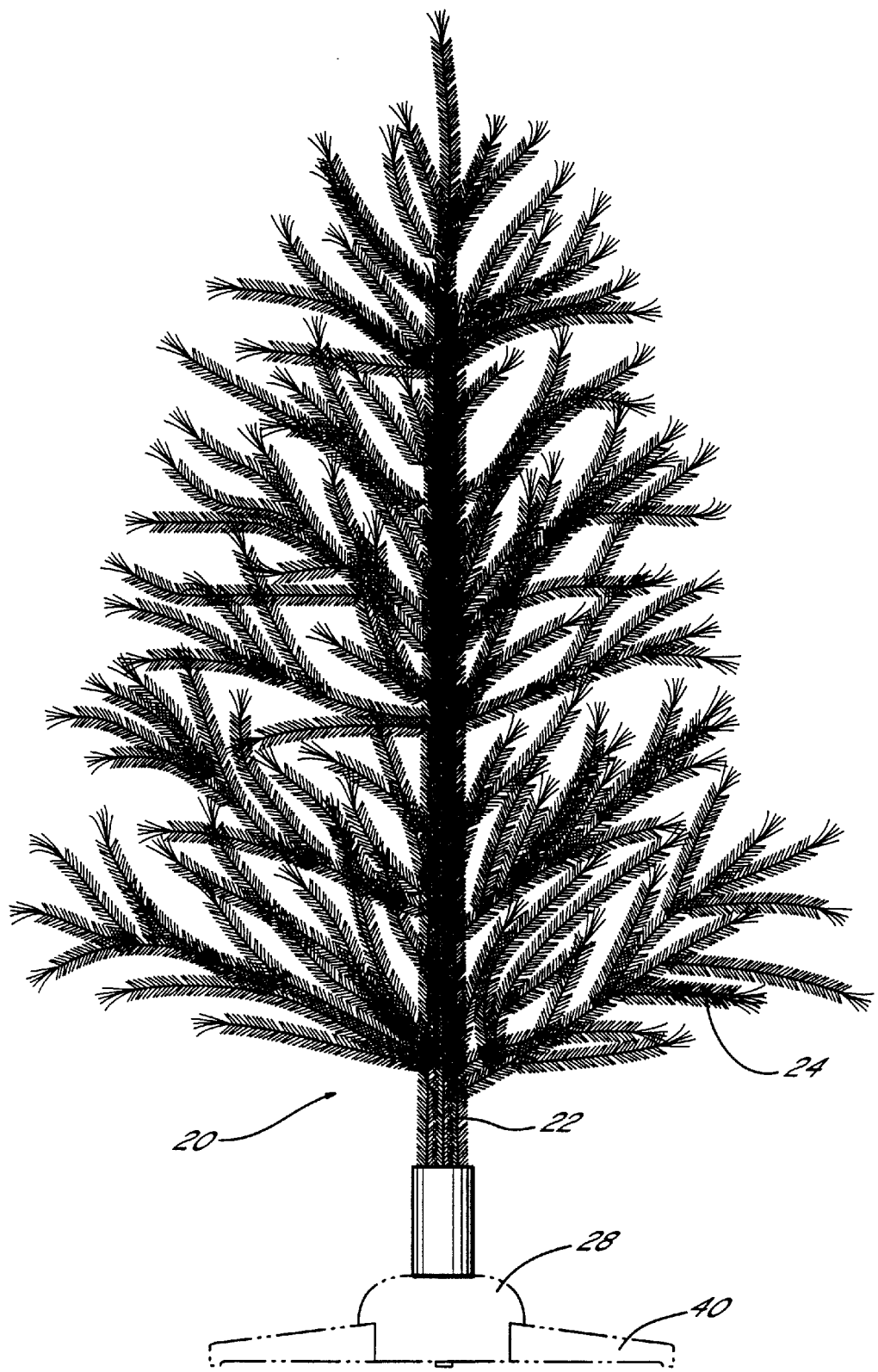
FIG. 3 illustrates an artificial tree in accordance with the invention.
Figure 3B:
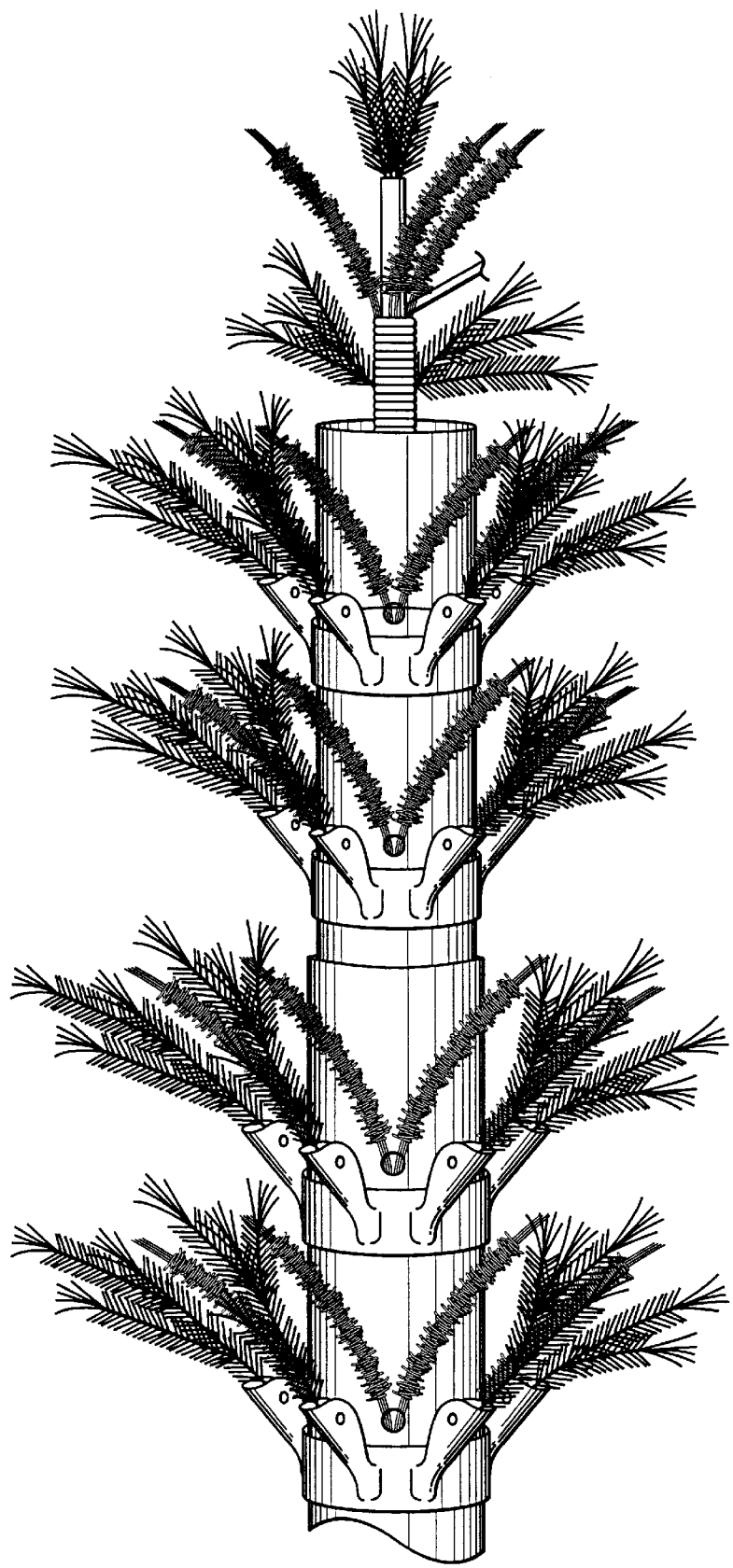

An embodiment of an artificial tree in accordance, which is preferably but not exclusively a Christmas tree, is illustrated in FIG. 3. A top portion of the tree is illustrated in close-up in FIG. 4. The tree 20 has a trunk 22 with a plurality of branches 24 which carry bundles of optical fibres, one such bundle being indicated 26 in FIG. 4. The trunk is preferably formed of a number of hollow trunk sections of decreasing diameter as one ascends the tree, as indicated in the inset to FIG. 3, where the differences in diameter are exaggerated for illustrative purposes. The tree is supported by a stand 28.

As can best be seen in FIG. 5 and the inset to FIG. 3, the tree 20 is of a type wherein the branches are pivotably secured onto the trunk 22. In FIG. 5 and the inset to FIG. 3 the branches are not shown to scale, but are shown only schematically for illustrative purposes. Each branch 24 comprises a central supporting wire, preferably formed of a metal wire which is secured to the trunk 22 by means of a collar-like bracket 30 provided with protruding fingers 32 each comprising a portion of bent metal into which a proximal end of the branch 24 extends, the branch having a loop 35 formed at its end through which a plug 33 extends so as to allow the branch to freely pivot. The plug 33 is preferably formed of a slightly resilient plastics material so that barb-like leading end 37 can be deformed as the plug is inserted. This construction allows the branches to be folded into a relatively flat orientation close up against the trunk 22, which allows for convenient packing of the tree during transport and storage after use, and when in use to be folded down into a realistic tree-like shape.

The bundles of optical fibres 26 extend up the hollow interior of the trunk 22 from the bottom of the trunk and are led through appropriately positioned openings 38 in the trunk 22 to the branches 24. At the bottom of the trunk 22 the ends of the optical fibres are cut so as to be uniformly aligned, as can be seen in the inset to FIG. 5.

Figures 4A, 4B:
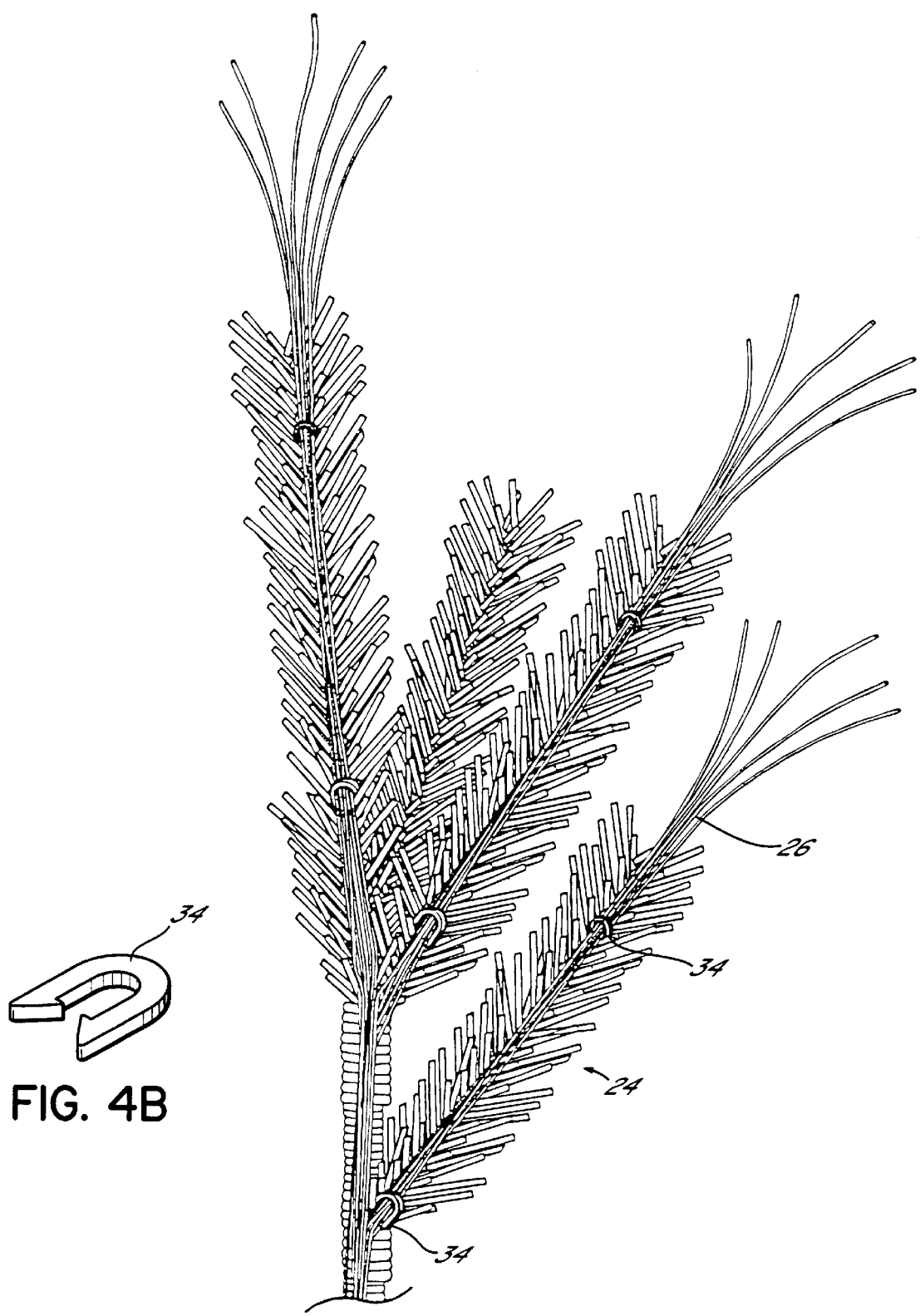
FIG. 4(a) is a close-up view of a top portion of the tree shown in FIG. 3.
FIG. 4(b) is a view of a retaining clip.
Figure 5A:
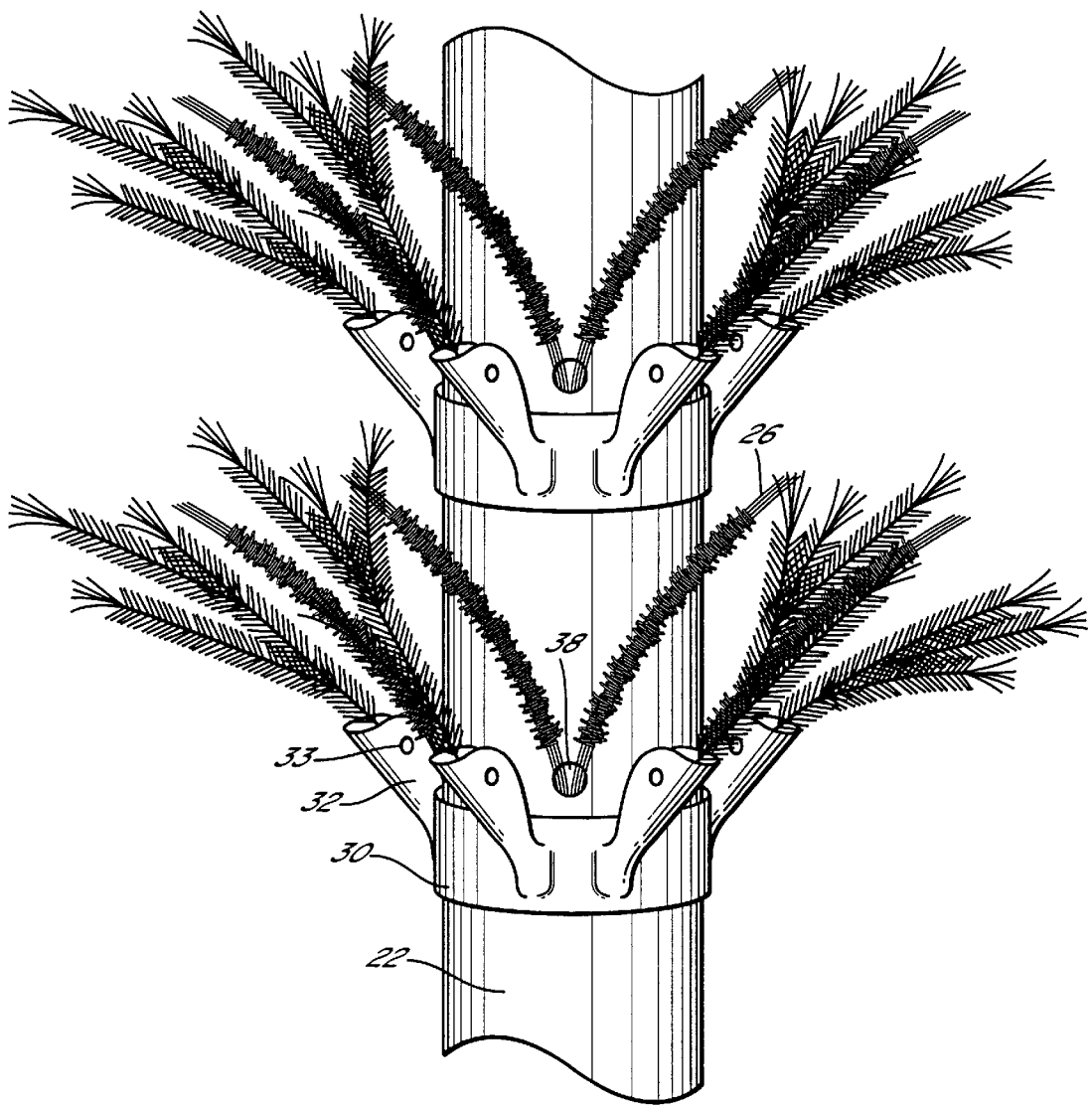
FIG. 5 shows a portion of a trunk of the artificial tree in accordance with the invention.
Figure 5B:
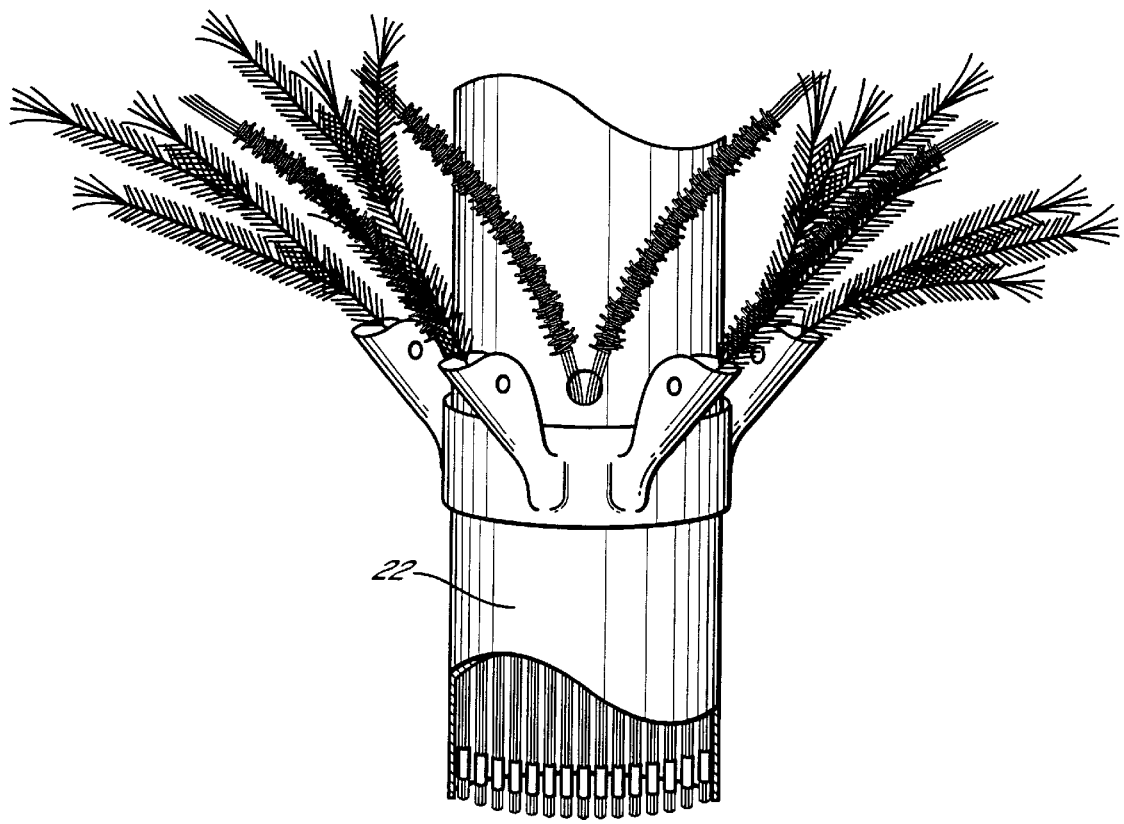
Figure 5C:
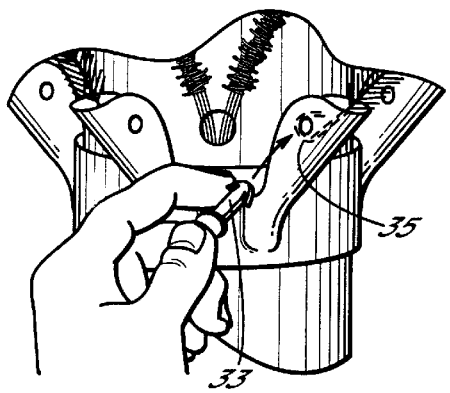
Figure 5D:
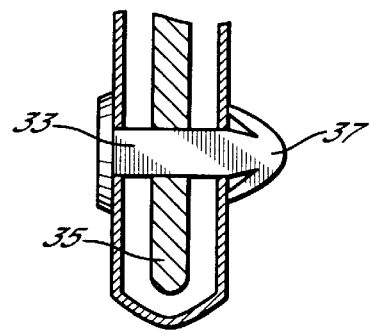

A major proportion of the optical fibres are led along the main central part of the branch with bundles comprising fewer fibres being led off along the smaller or sub-branches which join the main branch. Typically not every branch of the tree will have optical fibres. Instead of wrapping the bundles of optical fibres up within the individual branches as is conventionally done, in accordance with the invention, the bundles of optical fibres are secured onto the branches 24 by some appropriate securing means. These securing means 34 can take a variety of forms such as simple bent rings of wire or U-shaped plastics or metal clips, as shown in FIG. 4(b) which can be snap-fitted over the branches 24. These clips have end portions having inclined surfaces which facilitate the pushing of the clips over the branches 24 and fibre bundles. Where the bundles emerge from the openings, they may be covered by adhesive tape overlaid by a PVC roping 10 of a green colour (as described further below), and this may extend for some distance along the length of the bundle towards the free end, as indicated in FIG. 5. Alternatively, the bundles may be free of tape and roping.

Preferably, clips are used at one or two spaced intervals on each branch or sub-branch. It is arranged that at the branch tips the clips are not positioned exactly at the tips, but are spaced therefrom. This allows the bundles of optical fibres to splay out into a spray-like shape at the branch tips, which enhances the aesthetic quality of the tree especially when illuminated. By restraining the bundles 26 on the branches 24 with clips a limited degree of relative movement between the bundles 26 and branches 24 is allowed. This is particularly important in the region adjacent the trunk, where a degree of movement is necessary to allow the branches to be folded towards and away from the trunk.

At the very top of the tree a slightly different construction is employed. The hollow trunk 22 ends in a metal rod. Several bundles of optical fibres are led out of the hollow trunk below the top and are arranged about the central metal rod forming the trunk top, with portions of the bundles being enclosed by roping 10, and some led along the uppermost branches with the bundles being evenly distributed over the branches.

Figure 11:
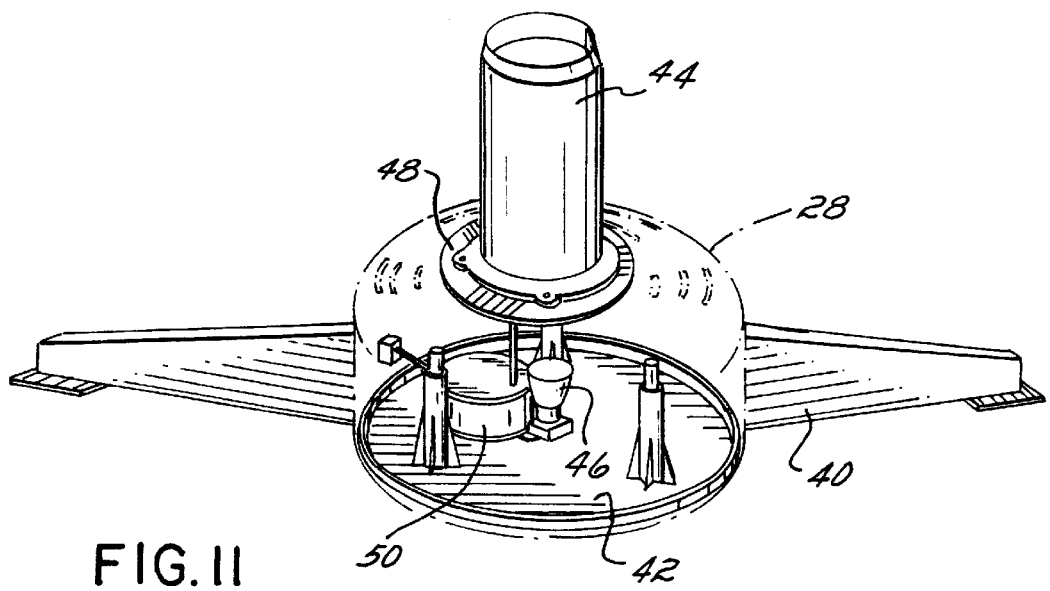
FIG. 11 shows a stand for the tree incorporating an illuminating device.
Figure 12A:
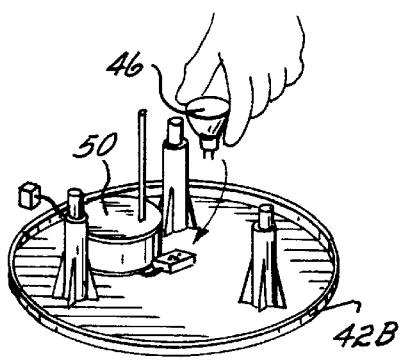
FIGS. 12(a) to (d) illustrate the assembly of a light source housing.
Figure 12B:
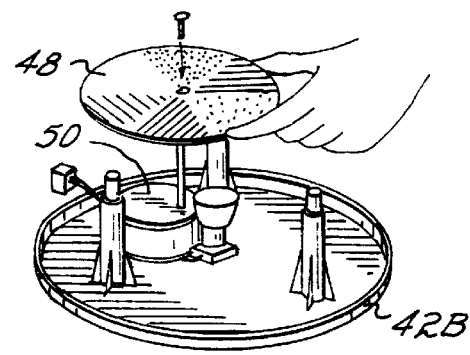
Figure 12C:
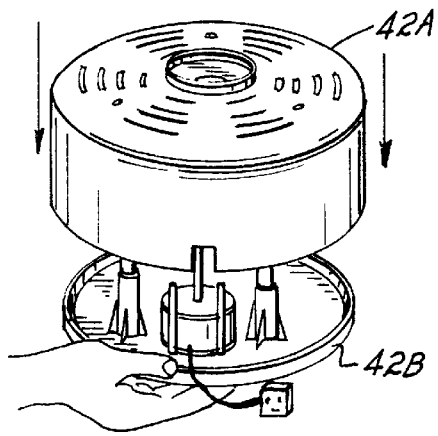
Figure 12D:
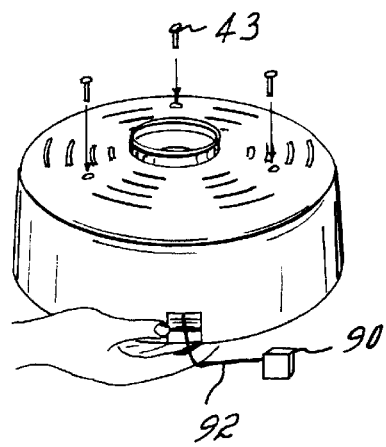
Figure 13A:
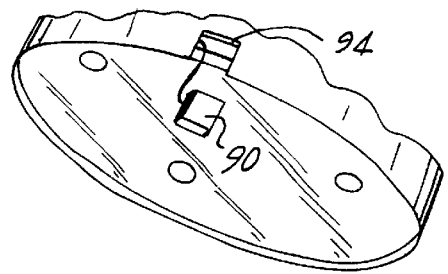
FIGS. 13(a) to (d) illustrate further assembly steps of the housing and stand.
Figure 13B:
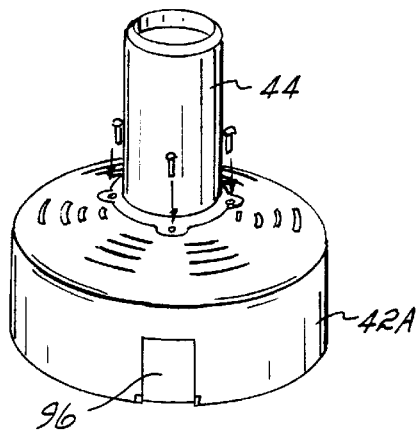
Figure 13C:
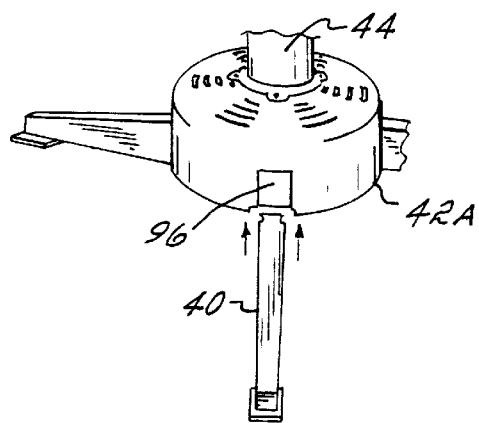
Figure 13D:
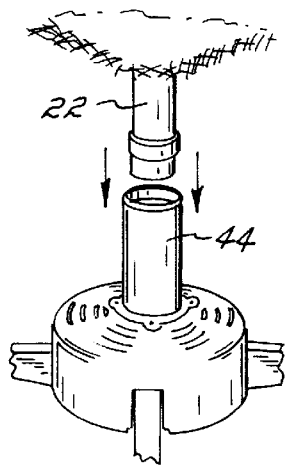

As best seen in FIG. 11, the stand 28 comprises a plurality of legs 40 which extend outwardly from a housing 42, and an upwardly protruding tubular collar part 44 which receives and supports an end of the trunk 22. Within the housing 42 there is arranged an illumination source in the form of an upwardly-directed spotlight 46 which illuminates the end of the trunk 22 when this is inserted in the support 44. Between the spotlight 46 and the support 44 is arranged a rotating colour wheel 48 which comprises a disc of light-translucent material or materials which may have a number of regions of different colour and which is mounted for rotation by a motor 50, to thereby change the colour and/or intensity of illumination of the optical fibres. By arranging appropriate patterns on the wheel 48 the illumination can be given a shimmering appearance as the colour and intensity of illumination to individual optical fibres in the bundles changes on rotation of the wheel 48.

Figure 6:
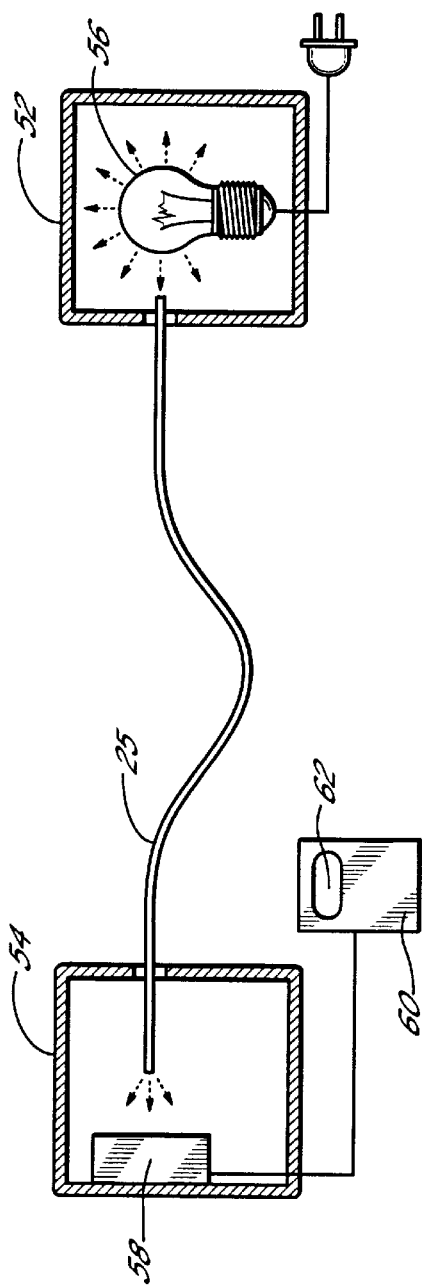
FIG. 6 shows a step of testing the optical fibres.
Figure 7A:
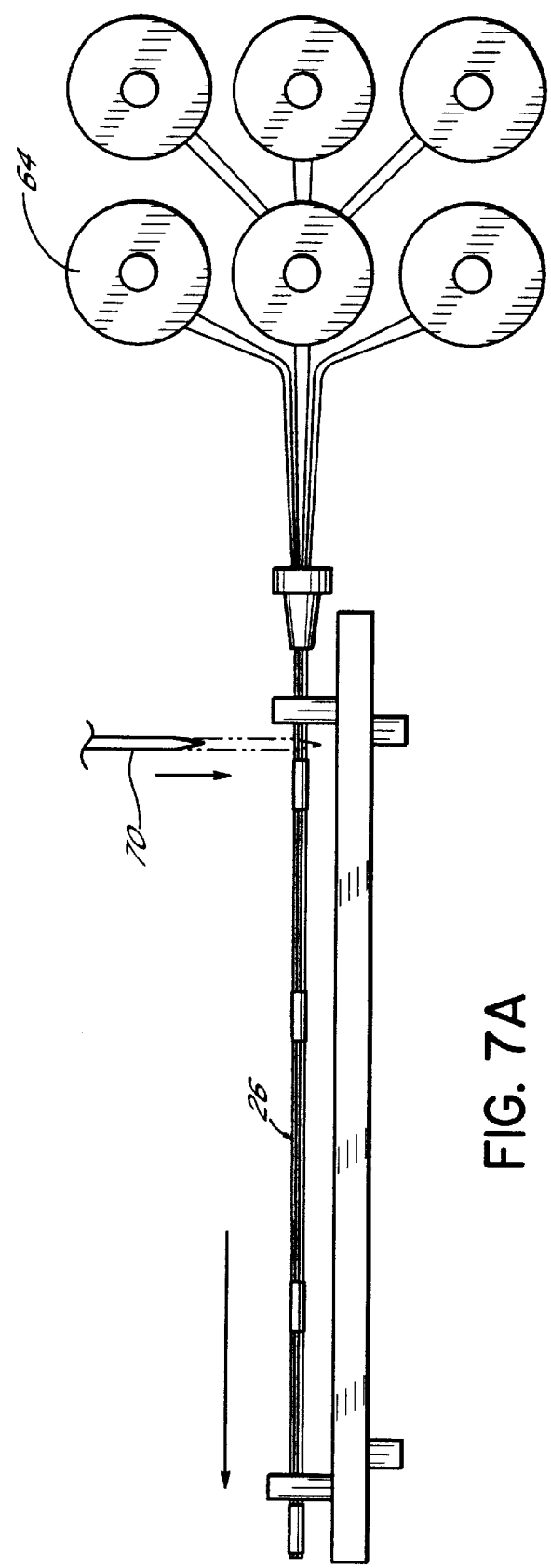
FIG. 7 shows a step of forming a number of individual optical fibres into a bundle of fibres.
Figure 8A:
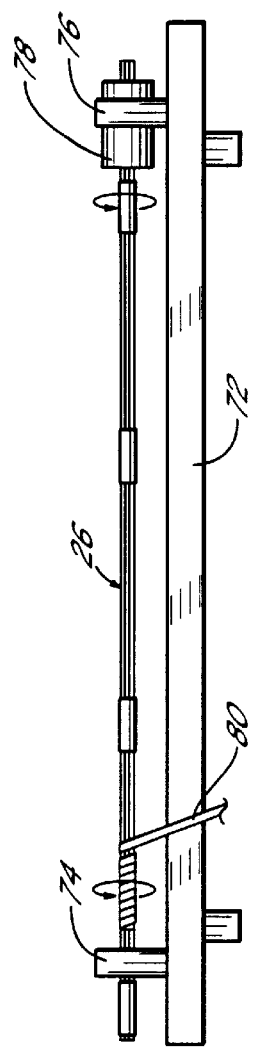
FIG. 8(a) illustrates the wrapping up of a portion of a fibre optic bundle in tape.
Figure 8B:
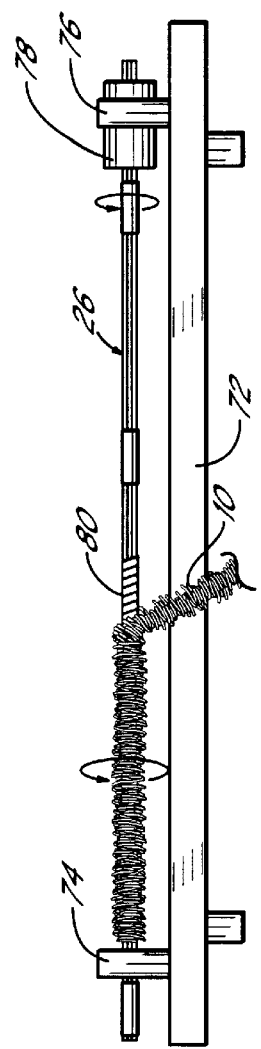
FIG. 8(b) illustrates the wrapping up of the fibre optic bundle in roping.
Figure 7B:
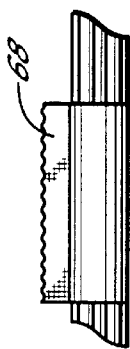
Figure 7C:
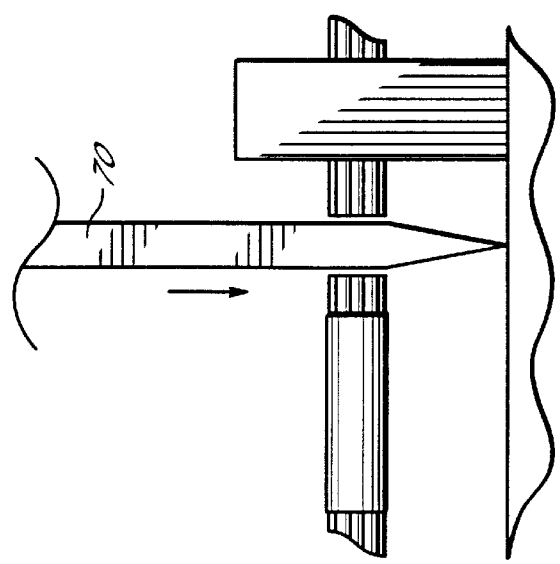

The assembly of the tree is now described. As shown in FIG. 6, some individual optical fibres from a batch are tested off-line for their integrity. Opposite ends of the fibre 25 are placed into enclosures 52 and 54. Enclosure 52 contains a light source 56 whilst enclosure 54 includes a light-detecting sensor 58 connected to a display 60 which gives a reading indicative of the intensity of detected light on display 62. If the intensity of detected light is less than a predetermined value, indicative of damage to the fibre, a fibre batch may be rejected. Assuming the batch of fibres pass the quality control test described the fibres are arranged into a plurality of bundles. FIG. 7 shows individual fibres being unwound from rolls of fibres 64 to form a bundle of fibres 26, and being secured at various positions along the bundle length by adhesive tape 68. The bundle is then severed from the rolls of fibre by means of cutter 70. As can be seen in FIG. 8(a), the severed bundle 26 of fibres is secured on a frame 72 between clamps 74 and 76, both allowing rotation of the bundle 26. A motor 78 rotates the bundle 26, which is wrapped in a length of tape 80 at a region near one end of the bundle 26. The tapered bundle is then wrapped in roping 10 using the same apparatus.

Figure 9:
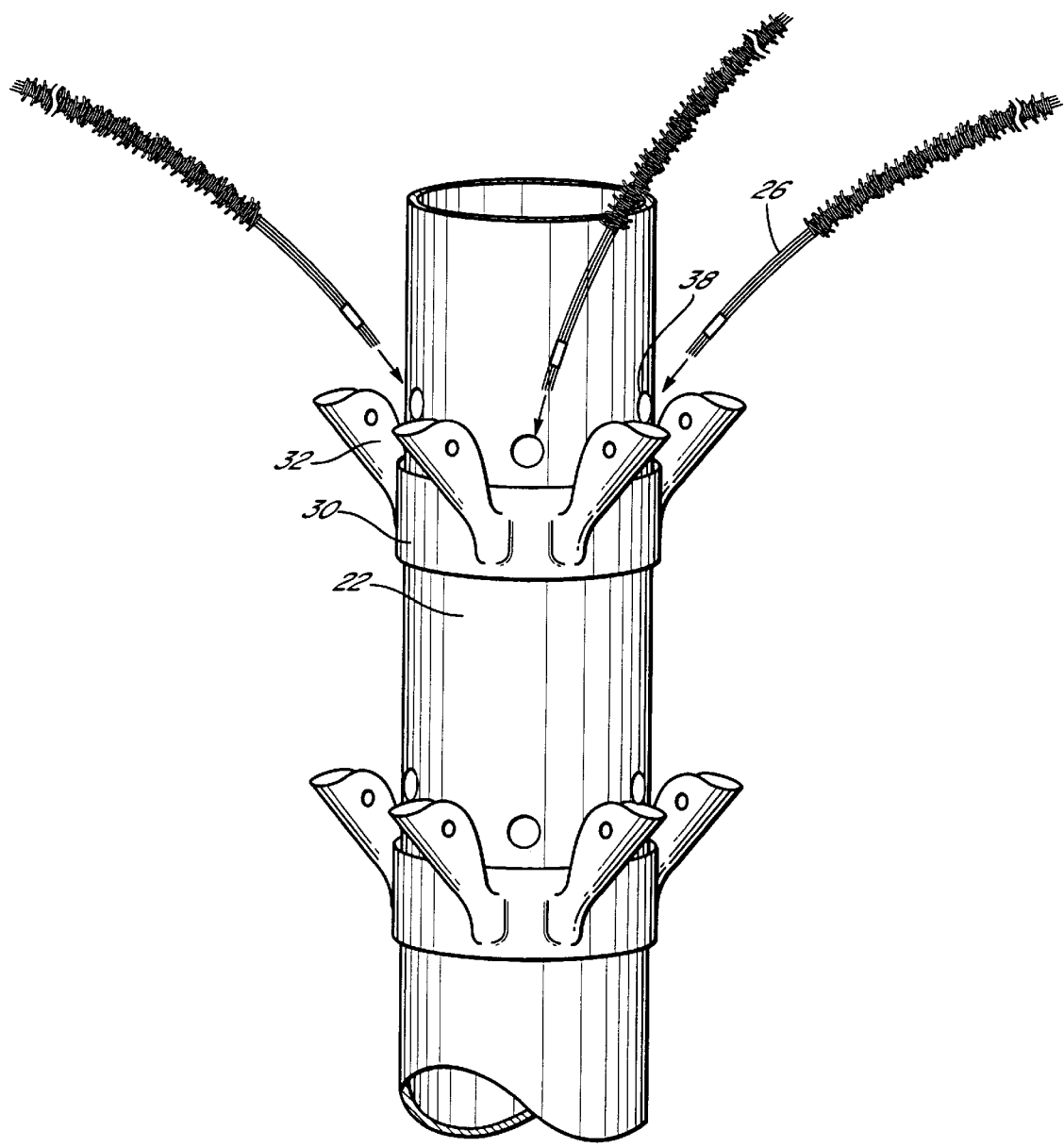
FIG. 9 illustrates a step of introducing bundles of fibres into the trunk.
Figure 10B:
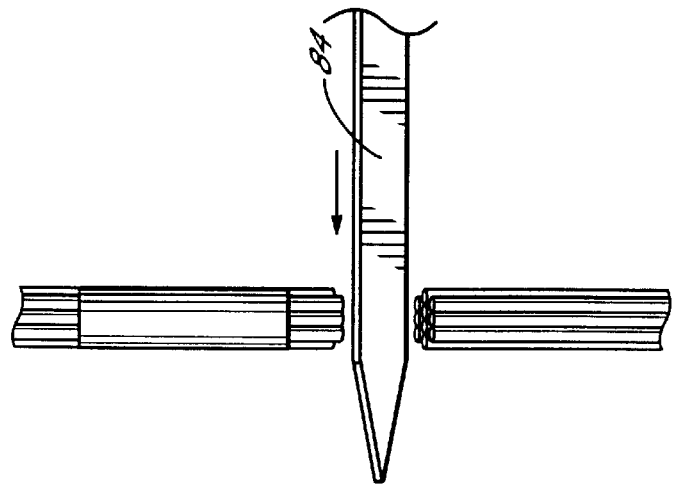
FIG. 10 illustrates the securing of ends of the optical fibre bundles and severing these.
Figure 10A:
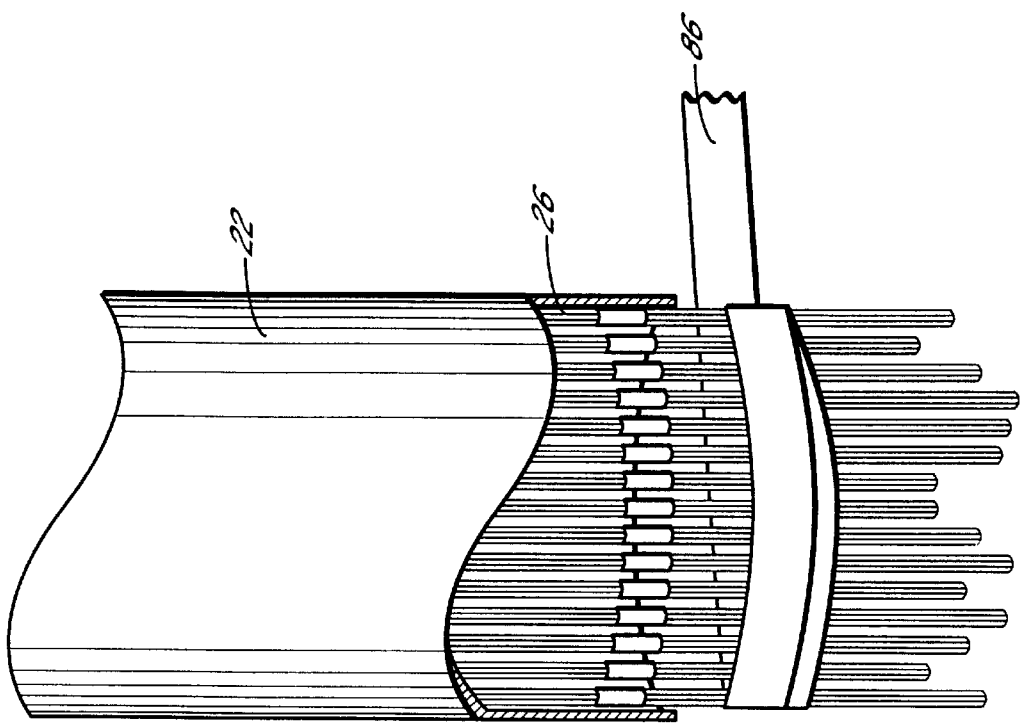

The bundles 26 are led through the apertures 38 in the trunk 22 as is illustrated in FIG. 9. Subsequent to the insertion of the bundles of optical fibres 26 the branches 24 are secured to the fingers 32 of the bracket 30. At the lower region of the trunk 22 the bundles of optical fibres 26 protrude from the bottom of the trunk 22 and are generally of a variety of different lengths. The various bundles 26 are secured together by wrapping around a further length of adhesive tape 82, and at a region just below this securing tape 82 the fibres are severed with a cutting blade 84 so that the fibres extending from the trunk 22 are all uniformly aligned, as indicated in the inset to FIG. 10.

The bundles of optical fibres 26 are then led along the branches, along the main central portion of each branch, with small bundles of optical fibres being led off the main bundle along sub-branches. The bundles of optical fibres are secured by means of retaining clips 34 which are snap-fitted over the fibres and the branches with preferably one or two clips used for each sub-branch. As noted above, the clips are not positioned at the branch tips but spaced therefrom to allow the optical fibres to readily splay outwardly at the branch tips.

FIGS. 12 and 13 illustrate some of the assembly steps involved in assembling the stand 28 and housing 42. FIG. 12(a) shows the housing cover 42A removed and the spotlight bulb 46 being fitted. The colour wheel 48 is subsequently fitted onto a shaft extending from the motor 50. At FIGS. 12(c) and (d) the housing cover 42A is fitted onto the housing base 42B by means of screws 43. As shown in FIG. 13(a) a socket 90 which is connected to cable 92 providing the electrical connection to the motor 50 and spotlight 46 is fitted into a socket recess 94 in the housing cover 42A. In use an electrical lead coming from an ac-dc adaptor is plugged into the socket 90. The tubular collar 44 is screwed onto the housing cover part 42A, as shown in FIG. 13(b), and the legs 40 fitted by upwardly push-fitting this into seats 96 formed in the housing cover 42A. Finally, the tree 20 is fitted so that the base of the trunk 22 is received in the tubular collar 44.

I claim:

1. An artificial tree comprising:
   a trunk,
   a plurality of branches secured to the trunk,
   a plurality of optical fibres extending along the trunk to the branches and being arranged in bundles which extend along the branches, and
   a plurality of bundle retainers secured to the branches the bundles of optical fibres being loosely secured to the branches by said bundle retainers to allow a limited degree of movement of said bundles.

2. An artificial tree according to claim 1 wherein each bundle retainer is selected from the group consisting of bent wire rings and clips.

3. An artificial tree according to claim 1 wherein the bundle retainers are arranged at a position spaced from free ends of the branches, the optical fibres splaying outwardly at the branch ends.

4. An artificial tree according to claim 2 wherein the clips comprise generally U-shaped elements of springy material, the legs of the U-shape being formed with inclined surfaces facilitating the pushing of the clip over the optical fibres and branches.

5. An artificial tree according to claim 1 wherein the fibres are arranged in bundles led along the interior of the trunk to emerge through openings in the trunk near the respective branches.

6. An artificial tree according to claim 1 wherein the branches are pivotably secured to the trunk.

7. An artificial tree according to claim 1 further comprising a light source the optical fibres extending from the light source, along the trunk to the branches.

8. An artificial tree according to claim 7 wherein the light source is enclosed in a housing at the base of the tree, and wherein there is provided a rotatable colour wheel between the light source and lower ends of the fibres at which the light source is directed.

9. An artificial tree comprising:
   a trunk,
   a plurality of branches secured to the trunk,
   a plurality of optical fibres extending along the trunk to the branches, and being arranged in bundles which extend along the branches, and in the region of the free ends of the branches being free to splay out into a spray-like shape and
   a plurality of bundle retainers secured to the branches, the bundles of optical fibres being loosely secured to the branches by said bundle retainers to allow a limited degree of movement of said bundles.

10. An artificial tree according to claim 9 wherein the bundles of fibres are secured to the branches by bundle retainers which are spaced from the free ends of the branches.

11. An artificial tree according to claim 9 wherein the optical fibre bundles are secured to the branches by bundle retainers arranged spaced at intervals along the branches.

12. An artificial tree according to claim 11 wherein the clips comprise generally U-shaped elements of springy material, the legs of the U-shape being formed with inclined surface facilitating the pushing of the clip over the optical fibres and branches.

13. An artificial tree according to claim 9 wherein the fibres are arranged in bundles led along the interior of the trunk to emerge through openings in the trunk near the respective branches.

14. An artificial tree according to claim 9 wherein the branches are pivotably secured to the trunk.

15. An artificial tree according to claim 9 further comprising a light source, the optical fibres extending from the light source along the trunk to the branches.

16. An artificial tree according to claim 15 wherein the light source is enclosed in a housing at the base of the tree, and wherein there is provided a rotatable colour wheel between the light source and lower ends of the fibres at which the light source is directed.

17. A method of assembly of an artificial tree provided with optical fibre illumination comprising the steps of:
  (i) arranging optical fibres into a plurality of bundles, each comprising a plurality of fibres, and
  (ii) leading said bundles along the trunk and securing individual bundles to respective branches with bundle retainers to allow a limited degree of movement of said bundles relative to the branches.

18. A method according to claim 17 wherein each bundle retainer is selected from the group consisting of bent wire rings and clips.

19. A method according to claim 17 wherein the bundles of fibres are led along the interior of the trunk from a lower end thereof which is in use illuminated by a light source, to emerge from openings in the trunk near respective branches.

* * * * *